Oct. 15, 1940.  W. BARTOSCH  2,218,034
BEARING
Filed April 13, 1937  2 Sheets-Sheet 1
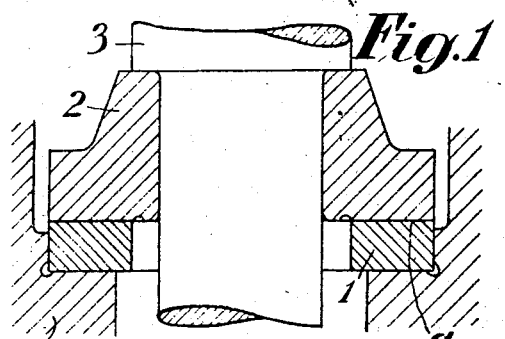
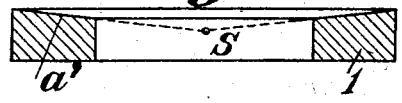
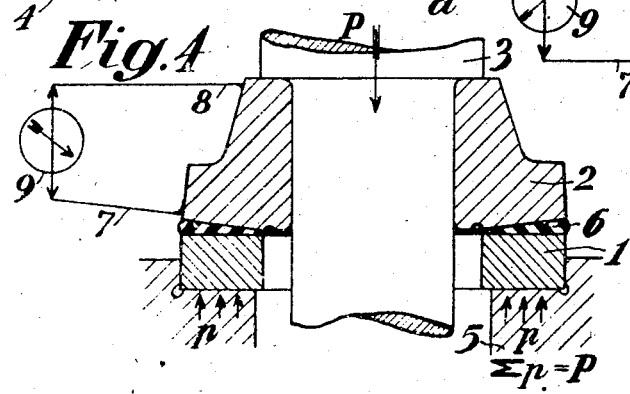
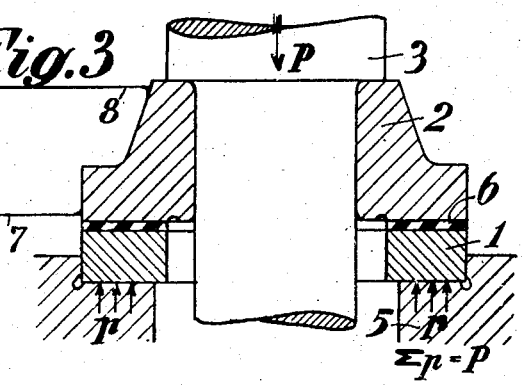
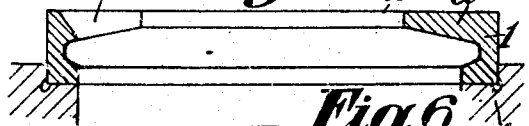
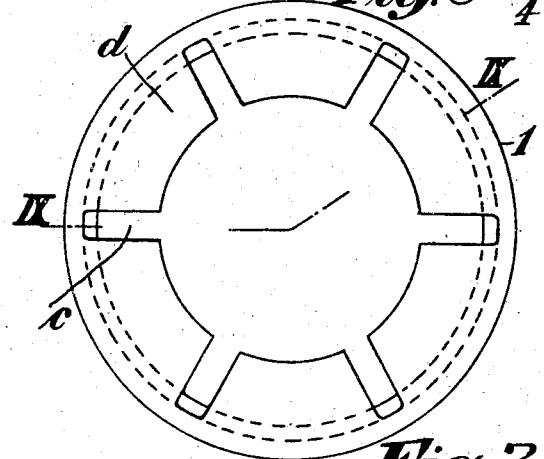
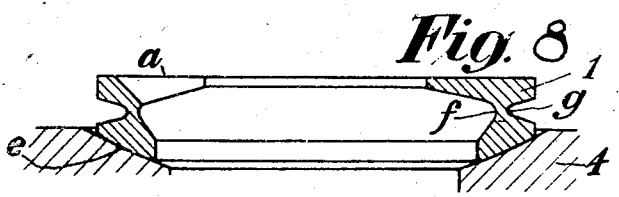
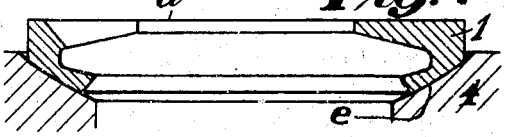
Inventor:
W. Bartosch
By E. F. Wenderoth
Atty Oct. 15, 1940.                W. BARTOSCH                 2,218,034
                                BEARING
                       Filed April 13, 1937          2 Sheets-Sheet 2
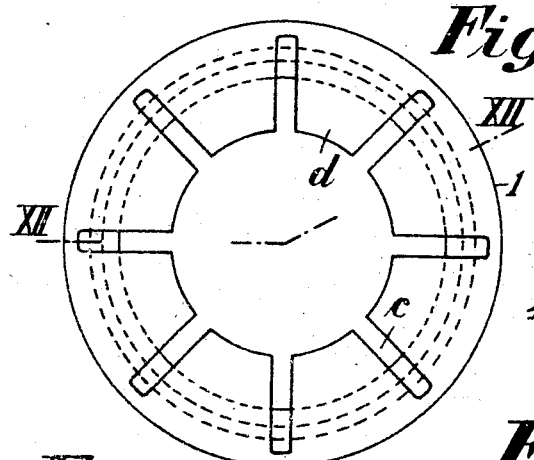
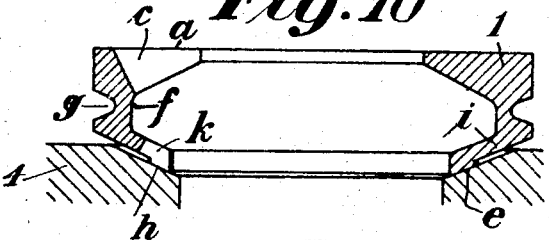
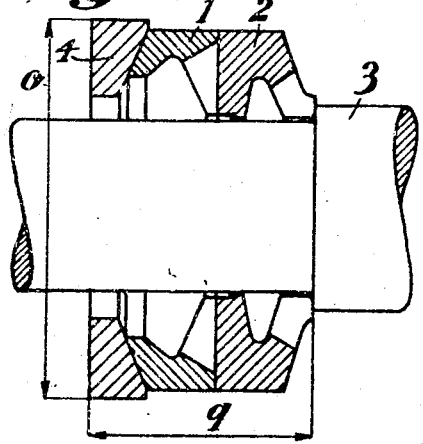
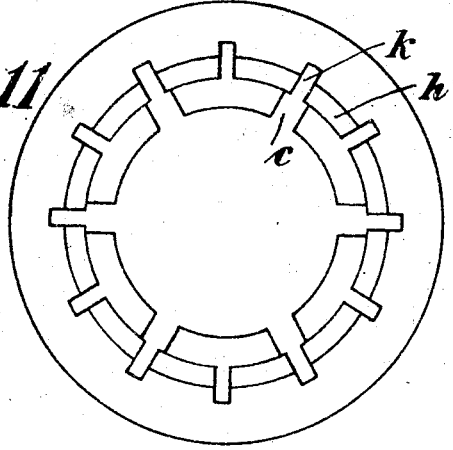
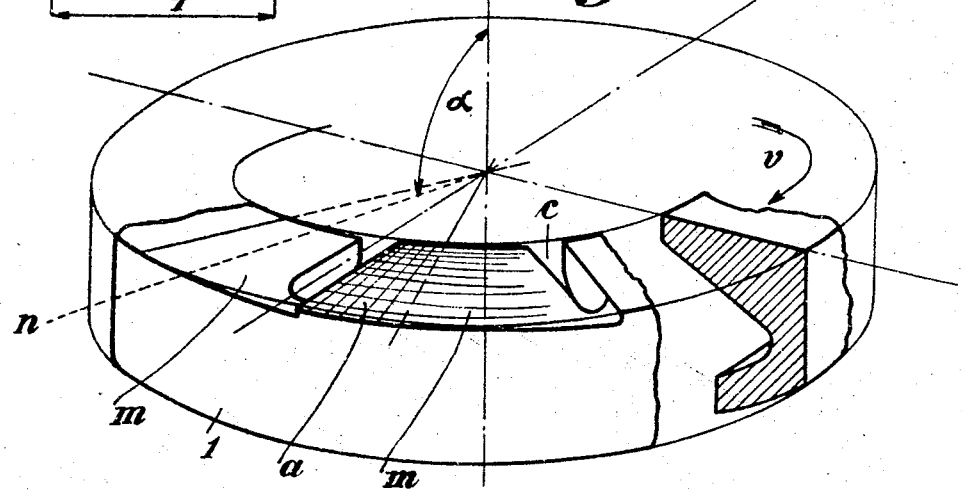

Patented Oct. 15, 1940

2,218,034

UNITED STATES PATENT OFFICE 2,218,034

BEARING

Wolfgang Bartosch, Vienna, Austria, assignor to the firm Carbobronze Röhrenwerk Gesellschaft m. b. H., Vienna, Austria, a company of Austria Application April 13, 1937, Serial No. 136,692
In Austria April 23, 1936

10 Claims. (Cl. 308—139)

This invention has reference to improvements relating to bearings and is concerned specifically with plain bearings which are loaded substantially in or parallel to the axis of rotation of the rotating part, such bearings which include thrust bearings and pedestal and like bearings being referred to hereafter for simplification in description as thrust bearings.

It is known that deformation phenomena at the liquid lubricated bearing surfaces of plain thrust bearings can considerably influence their behaviour. In most cases deformation of the bearing surfaces results in local, half-dry friction, whereby wear and corrosion can take place. This is particularly the case if such plain thrust bearings have to work under heavy loads, high temperatures or otherwise under conditions which are characterised by slight thickness of the lubricating layer.

In thrust bearings the possibility of the deformation of the bearing surfaces under the load of the bearing has hitherto scarcely been considered, because, on the one hand, the tiltable shoe bearings (according to Michel or Kingsbury) in which at least one of the engaging members is composed of one or more separate or flexible joined portions which are free to assume tilted positions in response to the wedging actions of the oil, are insensitive to deformation in a high degree in a certain way and on the other hand, in thrust bearings the wear produced, as the result of hitherto unobserved deformations, has been considered to be quite unavoidable.

Figure 1 is a cross sectional view of a thrust bearing illustrating an ordinary construction.

Figure 2 is a cross sectional view of the stationary bearing ring of the thrust bearing shown in Figure 1 after the same has been worn.

Figure 3 is a cross section of a thrust bearing of the type shown in Figure 1 illustrating the manner in which the action of such thrust bearing was investigated.

Figure 4 is a similar view to that shown in Figure 3 showing the result of application of pressure.

Figure 5 is a cross sectional view of a bearing ring taken on the section line IX—IX of Figure 6 illustrating a further modified construction.

Figure 6 is a plan view of the modification illustrated in Figure 5.

Figure 7 is a cross sectional view of another constructional form of the invention.

Figure 8 is a cross sectional view of a still further modification taken on the sectional line XII—XII of Figure 9.

Figure 9 is a plan view of the modification shown in Figure 8.

Figure 10 is a cross sectional view of another modification of the invention.

Figure 11 is a bottom plan view of the modification shown in Figure 10.

Figure 12 is a diagrammatic perspective view of a still further modification, and Figure 13 is a cross sectional view through still another modification.

Figures 1 to 4 show diagrammatically ordinary constructions for the purpose of illustrating the idea on which the present invention is based.

Figure 1 shows by way of example a thrust bearing of which it is known by experience that it runs conical at the bearing surfaces.

In this figure, $1$ is the stationary bearing ring, $2$ the rotatable bearing ring, $3$ the shouldered shaft and $4$ the stationary casing. The contacting surface is denoted by $a$. Such a bearing will stand only comparatively slight bearing pressures and then only after it has been "run in" for a comparatively long time, which necessarily involves considerable wear at the bearing surfaces $a$. In Figure 2 the above-mentioned stationary bearing ring $1$ is shown after the bearing has been "run in", the bearing surface produced during the "running in" being denoted by $a'$. Under load the bearing surface of the thrust collar $2$ is deformed by bending into the form of a shell and if the stationary bearing ring $1$ consists of a softer material than the rotatable bearing ring $2$, then the contact surface of the former is worn away by the bending into the shape of a cone with the point S of the cone downwards, as shown in Figure 2. If the rotatable bearing ring $2$ is softer or is less able to withstand wear than the bearing ring $1$, the former becomes worn away and the point of the cone S produced by the wearing lies upwards.

It has been found by experiments that bending of the loaded bearing parts is the cause of the above described wear phenomena. If, for example, the rotatable bearing ring $2$ be examined for signs of bending under a stress corresponding to the stress during operation, it will be found that its bearing surface assumes approximately the surface of a cone.

In Figures 3 and 4 are shown diagrammatically the principles of an investigation of this kind. The rotatable bearing ring $2$ which revolves when the bearing is in use rests in the experimental apparatus on a soft body 6, preferably a rubber plate, which takes the place of the lubricating film. The comparatively rigid foundation which takes the place of the engine casing is denoted by 5. To the rotatable bearing ring 2 are connected rigid arms 7 and 8 diagrammatically represented between which a sensitive measuring gauge 9 is disposed. If the experimental apparatus be loaded with a force P being the sum of the partial pressures p the measuring arms 7 and 8 alter, as shown in Figure 4, by the symbols employed in Figure 3, in their distance from each other owing to the bending of the rotatable bearing ring 2. The bending of the rotatable bearing ring 2 is then measured in accordance with the magnitude of the force P. Experiments show that an approximately conical deformation of the bearing surface of the rotatable bearing ring 2 takes place. It lies in the order of magnitude of the thickness of the lubricating layer, but is, as regards its absolute amount, frequently a multiple thereof. The result of this is that when the bearing is in use the lubricant is squeezed away in zones whereby wear and seizing or jamming ensue.

As even by making the rotatable bearing ring 2 as shown in Figures 1, 3 and 4 of ample dimensions, the deformations can reach disadvantageous magnitudes, these disadvantages can only be combated by the use of excessive amounts of material and expense in manufacture. Under some circumstances deformations may also take place in the stationary bearing member owing to peculiarities in its formation or its support due to the load upon it, which deformations cannot be eliminated even by making the rotatable bearing ring 2 of the most ample dimensions.

According to the present invention the squeezing out in zones of the lubricant is prevented by so adapting the stiffness of the members carrying the bearing surfaces to each other that for maintaining the parallelism of the bearing surfaces, one or both of the aforesaid members are made of a cross sectional shape which permits one of the bearing members to so deform or set itself in accordance with the bending of the other that the lubricating layer is not broken through, owing to the approximate parallelism of the deformed bearing surfaces.

The invention will now be described with particular reference to Figures 5 to 13 of the accompanying drawings which show by way of example constructional forms of the stationary bearing members according to the present invention.

Figures 5 and 6 show in section and in plan respectively a construction of the stationary bearing ring 1 the section being taken on the line IX—IX of Figure 6. The bearing ring is subdivided in the manner above-described by grooves c, and conically hollowed out on the side remote from the bearing surface a and is thereby so weakened that the lugs d which carry the bearing surface will yield in respect of the load on the bearing and thus bring about the parallelism of the bearing surfaces by corresponding changes in shape.

Figure 7 shows in section another constructional form of the stationary bearing ring 1 in which instead of a plane supporting surface a spherical adjusting surface e known per se is provided on the underside, which permits the bearing ring to follow any oblique positions on the shaft which may occur on installing the bearing. In this constructional form too, grooves c and lugs d respectively may obviously be provided.

Figures 8 and 9 show in section on the line XII—XII of Fig. 9, and in plan a bearing ring with a spherical adjusting surface in which the portion of the bearing ring which carries the bearing surface is backed off obliquely (recesses f and g respectively). Grooves may be conveniently provided whereby lugs d are produced. The part of the bearing ring which carries the bearing surface can therefore easily adjust itself to correspond to the change in shape of the rotatable bearing ring 2.

Figures 10 and 11 show in section and underside plan respectively a stationary bearing ring 1 with a spherical adjusting surface e, in which the section of the bearing ring carrying the bearing surface a is constructed substantially like the stationary bearing ring shown in Figures 8 and 9. An annular seating rib h is provided on the spherical adjusting surface, this rib being connected to the remaining part of the stationary bearing ring by a comparatively weak, annular plate shaped part i. In the seating rib h are preferably provided grooves k which in their action correspond to the grooves c. Seating ribs of this kind may be also used in stationary bearing rings with a plane supporting surface. A bearing of this shape permits it to take up or absorb rapidly occurring deformation phenomena which emanate, for example, from vibrations of the shaft or defective construction of the revolving thrust collar without fracture of the lubricating film.

Bearings constructed according to this invention in which the bearing surfaces can adapt themselves to each other in the manner herein described, ensure in contradistinction to the usual constructions the maintenance of an ample lubricating film. An ample lubricating film which will also bear suddenly occurring brief excessive stresses without fracture and in a better way than a thin lubricating film caused by unsuitable construction of the bearing. In the constructions shown in Figures 10 and 11 in particular, the stationary bearing ring 1 has, owing to the cross sectional shape due to the recesses turned therein and to the provision of the grooves k a double springing whereby especially vibrations and the like are rendered harmless. Attempts have been made, particularly in bearings with tiltable guide blocks, that is to say Michel or Kingsbury bearings, to render the effect of vibrations innocuous by suspending or supporting certain parts of the bearing cardanwise. The same effect is obtained, however, in the construction just described at less costs and without increased sensitiveness or difficulty when installing the bearing.

It lies within the scope of the invention that the constructional steps described may be used singly or all together not only for the stationary bearing rings 1, but also for the rotatable bearing rings 2 or for both.

In order to obtain as ample a lubricating film as possible in thrust bearings the bearing surfaces of the stationary bearing rings 1 are flattened off by preference to a wedge shape in the well-known way and Figure 12 shows diagrammatically such a construction of a stationary bearing ring. In this figure the direction in which the rotatable bearing ring moves is indicated by an arrow v. Wedge-shaped surfaces m adjoin the grooves c in the direction in which the rotatable bearing ring moves. The oil is drawn into the wedge, put under pressure and thus reliably separates the metal bearing surfaces. This principle which is known per se can be used for the further improvement of all constructional forms described. It is possible in this case to set the generatrices n of the wedge surface, as is shown in Figure 12, at right angles to the axis of rotation (α=90°) or to allow them to run towards the axis at an angle α diverging from a right angle. In a bearing which is to run in both directions, the wedge surfaces are so formed that they spring from the grooves on both sides. The result of this formation of the wedge surfaces is that on deformation of the bearing surface taking place, a form of the wedge surfaces can be obtained which favours the hydrodynamic formation of pressure.

The lubrication may take place in any well-known way, for example, by wicks in which case these lie in the grooves c and thus extend to the bearing surface a. They enable permanent individual lubrication of the bearings to be obtained with protection from the entrance of foreign bodies. It is obvious that wicks may be replaced by other delivery devices which are well-known should occasion demand it.

The bearings according to this invention may be used instead of a ball bearing if constructed suitably. Figure 13 shows a constructional form of this kind with a spherical supporting surface. The diameter o of the spherical base ring 4 is exactly equal to that of an equivalent ball bearing, and the total height of the bearing does not diverge materially from that of an equivalent ball bearing. Owing to the special formation of the bearing rings and/or rotatable bearing rings according to this invention, it is possible to construct plain thrust bearings which, as a whole, are just as efficient as ball bearings and at the same time can be used within the space provided for ball bearings without material alteration in the mass to be built, in particular without any change in adaption to the diameter o. This is obviously possible also for plain thrust bearings with a plane bearing surface.

What I claim is:

1. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring.

2. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the radial dimension of the face part which includes the supporting surface being essentially greater than the radial dimension of the web.

3. A plain thrust bearing adapted for liquid lubrication comprising a rotatable bearing ring and a non-rotatable bearing ring wherein each of said bearing rings comprises an annular face part which includes a bearing surface and on the opposite side a face part which includes a supporting surface and an annular web connecting said annular face parts adapted to yield so that the bearing surface may deform itself in accordance with the conical deformations arising under pressure.

4. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the radial dimension of the face part which includes the supporting surface being essentially greater than the radial dimension of the web, the bearing-surface-including-face-part being provided with grooves weakening the stiffness of the bearing-surface-including-face-part.

5. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the radial dimension of the face part which includes the supporting surface being essentially greater than the radial dimension of the web, the bearing-surface-including-face-part being provided with grooves forming lugs weakening the stiffness of the bearing-surface-including-face-part.

6. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the radial dimension of the face part which includes the supporting surface being essentially greater than the radial dimension of the web, and recesses being provided to form the web.

7. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the supporting surface being constituted by an annular seating rib connected to the web by a comparatively weak annular part.

8. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the supporting surface being constituted by an annular seating rib connected to the web by a comparatively weak annular part, the bearing-surface-including-face-part being provided with grooves weakening the stiffness of the bearing-surface-including-face-part.

9. A plain thrust bearing adapted for liquid lubrication, comprising a rotatable bearing ring and a non-rotatable bearing ring, wherein one of the bearing rings consist of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the supporting surface being constituted by an annular seating rib connected to the web by a comparatively weak annular part, the bearing-surface-including-face-part being provided with grooves forming lugs weakening the stiffness of the bearing-surface-including-face-part.

10. A plain thrust bearing adapted for liquid lubrication, comprising a rotatable bearing ring and a non-rotatable bearing ring, wherein one of the bearing rings consists of an annular face part which includes the bearing surface and on the opposite side a face part which includes a supporting surface and an annular web connecting said annular face parts adapted to yield so that the bearing surface including face part may deform itself in accordance with the conical deformation of the other bearing ring, the supporting surface being constituted by an annular seating rib connected to the web by a comparatively weak annular part, grooves being provided in the annular seating rib weakening the stiffness of this rib.

WOLFGANG BARTOSCH.